United States Patent
Eggert

(10) Patent No.: US 9,502,924 B2
(45) Date of Patent: Nov. 22, 2016

(54) SUPPLY ENERGY ARRANGEMENT AND METHOD FOR PROVIDING A SUPPLY ENERGY

(75) Inventor: Holger Alfons Eggert, Graefelfing (DE)

(73) Assignee: EnOcean GmbH, Oberhaching (DE)

( * ) Notice: Subject to any disclaimer, the term of this patent is extended or adjusted under 35 U.S.C. 154(b) by 627 days.

(21) Appl. No.: 13/335,264

(22) Filed: Dec. 22, 2011

(65) Prior Publication Data

US 2012/0235495 A1   Sep. 20, 2012

Related U.S. Application Data

(63) Continuation of application No. PCT/EP2010/057445, filed on May 28, 2010.

(30) Foreign Application Priority Data

Jun. 24, 2009   (DE) .................. 10 2009 030 319

(51) Int. Cl.
*H02J 1/00* (2006.01)
*H02J 7/35* (2006.01)
*H02J 7/34* (2006.01)

(52) U.S. Cl.
CPC .................. *H02J 7/35* (2013.01); *H02J 7/345* (2013.01); *Y10T 307/696* (2015.04)

(58) Field of Classification Search
CPC ........... H02J 7/345; H02J 7/35; H02J 7/0019
USPC .................. 307/80, 64, 46; 320/108
See application file for complete search history.

(56) References Cited

U.S. PATENT DOCUMENTS

| | | | |
|---|---|---|---|
| 3,489,915 A | 1/1970 | Engelhardt | |
| 5,345,053 A * | 9/1994 | Kaneko | B23H 1/022 219/69.18 |
| 5,402,303 A * | 3/1995 | Luck | H01H 47/325 307/110 |
| 5,636,978 A * | 6/1997 | Sasaki | F23N 5/203 431/18 |
| 5,666,006 A * | 9/1997 | Townsley | H02J 7/0024 307/43 |
| 5,739,596 A * | 4/1998 | Takizawa | G06F 1/263 307/64 |

(Continued)

FOREIGN PATENT DOCUMENTS

| | | |
|---|---|---|
| DE | 10308411 | 2/2003 |
| DE | 10 2007 046 275 A1 | 4/2009 |

(Continued)

OTHER PUBLICATIONS

International Preliminary Report on Patentability for PCT/EP2010/057445 dated Jan. 4, 2012.

(Continued)

*Primary Examiner* — Jared Fureman
*Assistant Examiner* — Elim Ortiz
(74) *Attorney, Agent, or Firm* — Foley & Lardner LLP; James De Vellis

(57) ABSTRACT

Supply energy arrangement comprising an input (E) to which an energy source (Q) is coupled, an output (A) for connection of a load (V), a first energy storage device (E1) that is coupled to the input (E) and the output (A), a second energy storage device (E2) that is coupled to the output (A) and, via a switching means (S), to the input (E), and a control circuit (C) that controls the switching means (S) in such a manner that the switching means (S) connects/disconnects the second energy storage device (E2) to/from the input (E) according to the energy level of the first energy storage device (E1).

13 Claims, 3 Drawing Sheets

(56) References Cited

U.S. PATENT DOCUMENTS

| | | | | |
|---|---|---|---|---|
| 5,825,100 | A * | 10/1998 | Kim | G06F 1/263 307/150 |
| 6,329,797 | B1 * | 12/2001 | Bluemel | H02J 7/1423 322/28 |
| 7,015,748 | B2 * | 3/2006 | Wecht | H02J 9/061 327/538 |
| 8,427,098 | B2 * | 4/2013 | Moore | H02J 7/0013 307/46 |
| 8,547,057 | B2 * | 10/2013 | Dunworth | G06Q 30/0267 320/108 |
| 8,638,061 | B2 * | 1/2014 | Moore | H02J 7/0013 307/64 |
| 2005/0093514 | A1 * | 5/2005 | Shimizu | H02J 7/0019 320/116 |
| 2006/0133003 | A1 * | 6/2006 | Kular | H01M 10/4264 361/100 |
| 2010/0253146 | A1 * | 10/2010 | Eckert | B60L 11/005 307/48 |
| 2013/0271888 | A1 * | 10/2013 | Falk | H02H 3/02 361/93.1 |

FOREIGN PATENT DOCUMENTS

| | | | |
|---|---|---|---|
| EP | 0 974 492 | 1/2000 | |
| EP | 1 528 652 | 5/2005 | |
| EP | 1528652 A2 * | 5/2005 | ............... H02J 7/00 |
| FR | 2879852 | 6/2006 | |
| WO | WO-2004/114433 | 12/2004 | |
| WO | WO 2004114433 A2 * | 12/2004 | |
| WO | WO 2006067350 A1 * | 6/2006 | |

OTHER PUBLICATIONS

International Search Report for PCT/EP2010/057445 dated Aug. 5, 2010.
Sullivan R M et al: "AMPTE/CCE battery and charger performance" Energy Conversion Enginnering Conference, 1996. IECEC 96., Proceedings of the 31st Intersociety Washington, DC, USA Aug. 11-16, 1996, New York, NY, USA, IEEE, US LNKD-DPOI:10.1109/IECEC.1996.552917, vol. 1, Aug. 11, 1996, pp. 410-415, XP010197758 ISBN: 978-0-7803-3547-9.

* cited by examiner

SUPPLY ENERGY ARRANGEMENT AND METHOD FOR PROVIDING A SUPPLY ENERGY

RELATED APPLICATIONS

This application is a continuation of co-pending PCT International Application Number PCT/EP2010/057445, filed May 28, 2010, which, in turn, claims priority to German Application Number 10 2009 030 319.7, filed Jun. 24, 2009. The contents of the foregoing applications are incorporated herein in their entirety.

The invention relates to a supply energy arrangement and an associated method for providing a supply energy, in which a reliable energy supply is realized for a load by means of an energy source and an energy storage device. Storage of energy is always necessary whenever the energy source has an energy provision rate that is too low for the operation of the load. This is the case, for example, with environmental energy converters that convert light energy or heat energy in the environment into electrical energy. One challenge here is to provide sufficient supply energy even for times at which the environmental energy is not available, for example, during night periods, in which no light is available. Typically an energy storage device with a correspondingly large capacity that provides the supply energy for this period of time is chosen for this purpose. It is problematic that the time for charging the energy storage device to the energy level required to supply the load generally increases with the capacity of the energy storage device. If the energy source has only a low energy provision rate, then it can take an unacceptably long time before the load can be put into operation.

The problem of the invention is therefore to provide supply energy for a load with the required energy level quickly and for a long period of time.

The invention solves the problem by means of a supply energy arrangement comprising an input to which an energy source is coupled, an output for connecting a load, a first energy storage device that is coupled to the input and the output, a second energy storage device that is coupled to the output and, via a switching means, to the input, and a control circuit that controls the switching means in such a manner that the switching means disconnects the second energy storage device from the input while the first energy storage device is being charged by the energy source to at least a second predetermined energy level and the second energy storage device has an energy level that lies under a first predetermined energy level, and the switching means connects the second energy storage device to the input if the energy source has charged the first energy storage device to at least a second predetermined energy level and the energy level of the first energy storage device does not fall below a first predetermined energy level.

Since the second energy storage device is disconnected from the input during the charging of the first energy storage device, the entire energy present at the input is used to charge the first energy storage device. In this manner, the energy level necessary for operating the load can be quickly reached. The energy present at the input charges the second energy storage device only if the first energy storage device has reached the second predetermined energy level. The second energy storage device is charged only if the energy necessary for operating the load is already available in the first energy storage device. The second predetermined energy level is higher than the first predetermined energy level.

In a refinement, the first energy storage device is coupled to the second energy storage device by a nonreturn device in such a manner that energy can flow only from the second energy storage device to the first energy storage device. This prevents the already charged first energy storage device from discharging into the not-yet-charged second energy storage device.

In a refinement, the control circuit has a third energy storage device that is coupled to the input and supplies the control circuit with energy, wherein the energy level of the third energy storage device replaces the energy level of the first energy storage device for the purpose of controlling the switching means. In this manner, no energy for operating the control circuit is withdrawn from the first energy storage device.

In a refinement, the first and the second energy storage devices are coupled via a respective nonreturn device to the input, the nonreturn devices preventing energy flow from the respective energy storage device to the input. In this manner, the energy storage devices can be charged via the input, but they are not discharged by the input if the latter has a lower energy level than the energy storage devices.

In a refinement, the second energy storage device has an energy storage capacity that is at least ten times or at least one hundred times greater than the energy storage capacity of the first energy storage device. In this manner, the first energy storage device can be charged to the level necessary for operating the load very quickly in comparison to the second energy storage device, while the second energy storage device can supply a load with the necessary energy for a very long time compared to the first energy storage device.

In a refinement, the control circuit has an energy level comparator that compares the energy level of the first or the third energy storage device to the first and the second predetermined energy levels. In this manner, it is possible to check whether the energy level of the first or third energy storage device lies below the first predetermined energy level. At the same time it can be assured that the second energy storage device is charged only if the first or third energy storage device has already been charged to a sufficient energy level, i.e., at least to the second predetermined energy level, and thus has a sufficient energy level for the operation of the load.

In a refinement, an energy level limiter is provided that limits the energy level in the supply energy arrangement to a maximum value. In this manner, it can be assured that the supply energy arrangement will not be damaged by excessively high energy levels.

In a refinement, the energy storage devices are capacitors and the energy levels are voltages. In this manner, energy can be stored and regulated compactly in the form of electrical energy.

In a refinement, the nonreturn devices are diodes. A backflow of energy in the form of current from the capacitors in the direction of the input, or from the first to the second capacitor, can be avoided in this manner.

In a refinement, the energy source is an environmental energy converter. In this manner, environmental energy available at no cost can be used for the operation of a load.

In a refinement, the supply energy arrangement is configured as an integrated circuit. An integrated circuit reduces the manufacturing costs, increases the reliability and reduces the space requirement.

The problem is also solved by a method for providing a supply energy: First a first energy storage device is charged from an energy source to increase its energy level, and if the first energy storage device has reached a second predetermined energy level, a second energy storage device is also charged from the energy source, wherein, in case the first energy storage device has discharged to a first predetermined energy level, the second energy storage device is disconnected from the energy source for the period of time required to charge the first energy storage device back up to the second predetermined energy level.

This prevents the charging of the second energy storage device from negatively affecting the charging of the first energy storage device above the first predetermined energy level. All of the energy provided by the energy source is first used to charge the first energy storage device alone. Due to the preferential charging of the first energy storage device, a supply energy that has the required energy level for operating the load can quickly be provided.

In a refinement, the first energy storage device has an energy storage capacity that is at least ten times or at least one hundred times less than the energy storage capacity of the second energy storage device. Due to the lower energy storage capacity of the first energy storage device, it can be quickly charged to the required energy level for operating the load. Only after that the larger energy storage device is charged with the excess energy from the energy source. Because of its larger capacity, the second energy storage device serves for long-term energy supply for the load.

In a refinement, if the energy source cannot deliver the supply energy that is to be provided, the lacking supply energy is first withdrawn from the first energy storage device and then, if required, from the second energy storage device as well. This assures the provision of the supply energy even if the energy source does not deliver sufficient energy for operating the load.

In a refinement, the energy level of a third energy storage device, instead of the energy level of the first energy storage device, is used to determine whether the second energy storage device will be charged, the third energy storage device being coupled to the energy source and not serving to provide supply energy. The third energy storage device is directly charged by the energy source and does not place a load on the first and second energy storage devices.

In a refinement, an energy flow from the first, second and third energy storage device to the energy source, and from the first energy storage device to the second energy storage device, is prevented. This assures that the energy storage devices do not lose their energy via the input to the energy source, and that the first energy storage device can be charged before the second energy storage device.

The supply energy and the method are used to operate a sensor or actuator each having a radio module for communication. Because of the preferred charging of the first energy storage device, these devices, i.e. sensor and actuator, are quickly ready for use and can be charged via the second energy storage device if the environmental energy converters do not provide any energy.

The invention will be described below with reference to embodiments and with the aid of figures. Therein:

Figure 1:
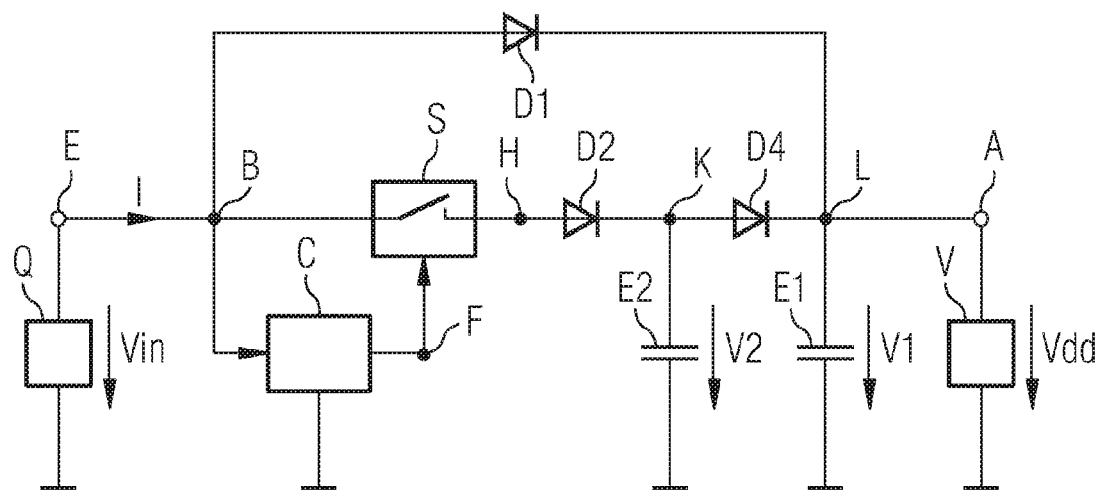
FIG. 1 shows an exemplary embodiment of a supply energy arrangement.

FIG. 1 shows an exemplary embodiment of a supply energy arrangement with an input E and an output A. An energy source Q that supplies a current I and a voltage Vin in the case of an electrical energy source is connected to the input E. The energy source Q can be, for example, an environmental energy converter that converts environmental energy into electrical energy. Environmental energy converters are, for example, photovoltaic converters or thermovoltaic converters, which convert light energy or heat energy in the environment into electrical energy. The supply energy arrangement provides the energy required for operating a load V with the output voltage Vdd at the output A.

In order to store the energy of the energy source Q, a first energy storage device E1, which is connected via a nonreturn device D1 to the input E, is provided. In this manner, energy can flow only from the input E to the first energy storage device E1, but not back. The first energy storage device E1 is further connected to the output A, so that the energy stored in it can be supplied to the load V. In the present exemplary embodiment, the first energy storage device E1 is a capacitor and the nonreturn device D1 is a diode.

In order to store the energy of the energy source Q, a second energy storage device E2, which is connected via a nonreturn device D2 and a switching means S to the input E, is additionally provided. Due to the nonreturn device D2, energy can flow only from the input E to the second energy storage device E2, but not back. The second energy storage device E2 is additionally connected via a nonreturn device D4 to the output A and the first energy storage device E1. Due to the nonreturn device D4, energy can flow only from the second energy storage device E2 to the first energy storage device E1, but not back. This assures that the first energy storage device E1 does not discharge via the second energy storage device E2. The second energy storage device E2 has an energy storage capacity that is at least one hundred times greater than the energy storage capacity of the first energy storage device E1. As with the first energy storage device E1, the second energy storage device E2 is a capacitor and the nonreturn devices D2 and D4 are diodes.

The switching means S is controlled by a control circuit C that is connected via the node B to the input E. If the first and the second energy storage devices E1 and E2 are discharged, then by opening the switching means S, the first energy storage device E1 is first charged by the energy source Q to a second predetermined energy level N2. Only thereafter the second energy storage device E2 is connected to the energy source Q by closure of the switching means S and charged. As soon as the energy level V1 of the first energy storage device E1 falls below a first energy level N1, the second energy storage device E2 is disconnected from the input E by the switching means S, and its charging is thus interrupted. All of the energy from the energy source Q not required by the load V charges the first energy storage device E1.

Since the first energy storage device E1 has a very small capacity compared to the second energy storage device E2, it does not take long until the first energy storage device E1 has an energy level with which a load V connected at the output A can be operated. Only thereafter the time-intensive charging of the much larger second energy storage device E2 is begun with the excess energy of the energy source Q.

In the present case, the energy levels are voltages and the energy storage devices are capacitors. The above-described principle can also be applied to other forms of energy, such as electric currents, thermal energy or kinetic energy, in which cases the energy is then stored in coils, thermal containers or flywheels.

Figure 2:
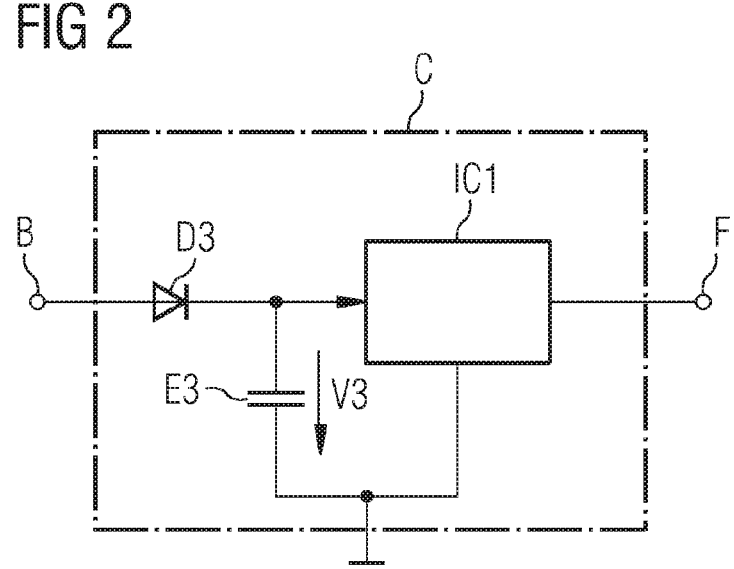
FIG. 2 shows an exemplary embodiment of a control circuit.

FIG. 2 shows an exemplary embodiment of a control circuit C that comprises a nonreturn device D3, a third energy storage device E3 and an energy level comparator IC1. As shown in FIG. 1, the control circuit C is connected via the nodes B and F to the remaining parts of the supply energy arrangement. The nonreturn device D3 is connected to the input E and allows energy from the energy source Q to flow to the energy level comparator IC1 and to the third energy storage device E3. The third energy storage device E3 is charged thereby and also serves to supply the energy level comparator IC1, if the energy source Q has an energy level Vin that lies below the energy level V3 of the third energy storage device E3. Discharging of the third energy storage device E3 via the input E is inhibited by the nonreturn device D3. The energy level comparator IC1 has a hysteresis with a first predetermined energy level N1 and a second predetermined energy level N2, the hysteresis preventing a continual actuation of the switching means S. The first predetermined energy level N1 can also be identical to the second predetermined energy level N2, however.

If the nonreturn devices D1 and D3 are identical, then the energy levels V1 and V3 at the first energy storage device E1 and the third energy storage device E3 are identical during the time of joint charging by the energy source Q. The energy level V3 at the third energy storage device E3 is thus a measure of the energy level V1 of the first energy storage device E1. Instead of the energy level V3 of the third energy storage device E3, the energy level V1 of the first energy storage device E1 can also be used directly in the control circuit C, by connecting the input of the control circuit C to the node L in FIG. 1. The energy level comparator IC1 is operated here from the energy of the first energy storage device E1, and the second energy storage device E2 provided for the load V.

Figure 3:
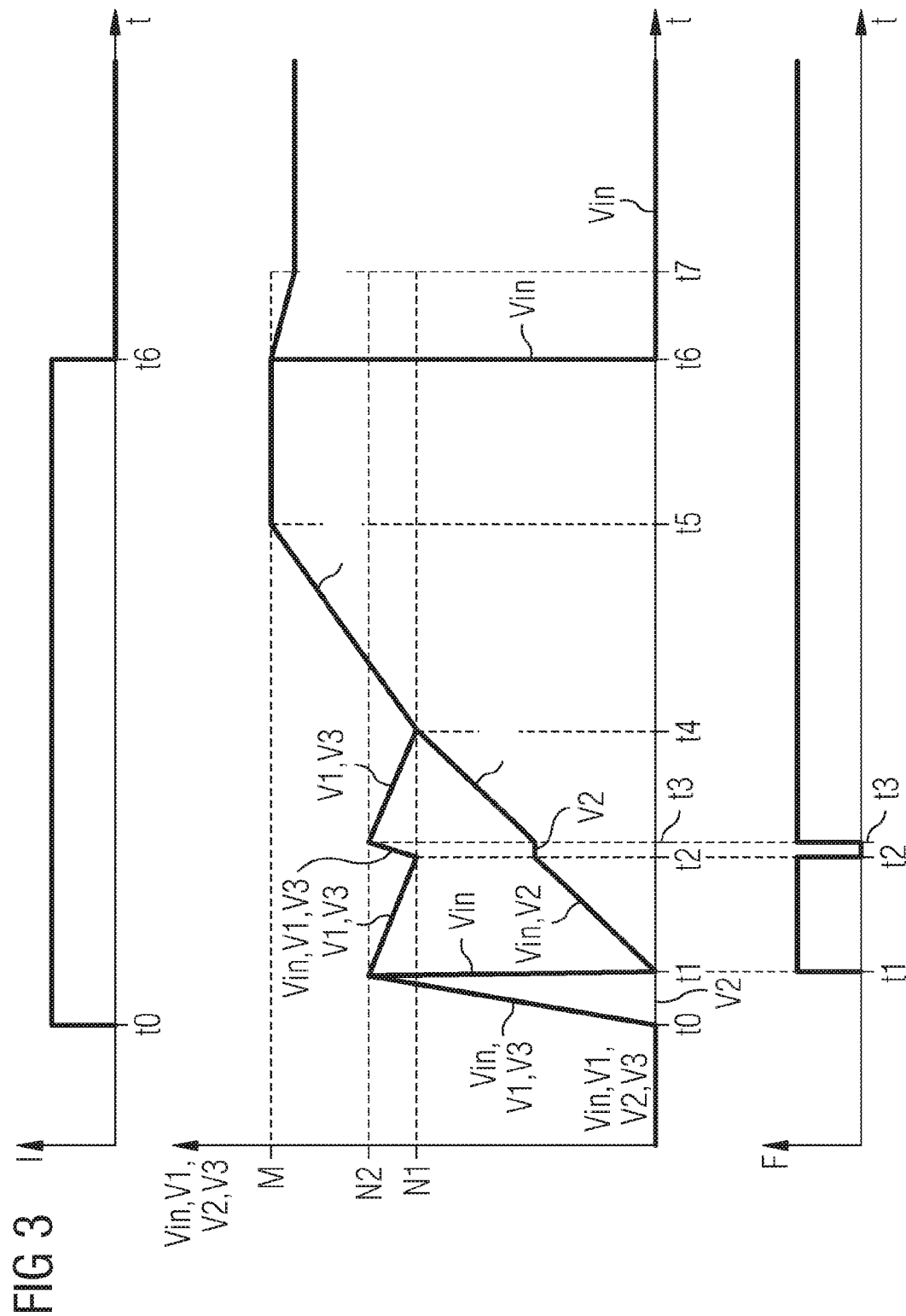
FIG. 3 shows examples of energy curves over time.

FIG. 3 shows exemplary and schematic timing charts of the energy levels that appear when the supply energy arrangement according to FIGS. 1 and 2 is operated. In the following, the energy levels will be indicated as voltages and the energy storage devices as capacitors, although as described above, other energy forms can also be used. To simplify the representation, the voltage drops at the diodes D1, D2, D3, D4 are ignored in the time curves with some exceptions.

Starting from the time t0, it is assumed that the energy source Q is supplying a constant current I at an input voltage of Vin. This is the case, for example, if the energy source Q is a photovoltaic converter, which acts like a current source under constant irradiation conditions. At the same time, it is assumed that the energy storage devices E1, E2 and E3 are empty, i.e., the capacitors have voltages of V1=V2=V3=0.

The voltage V3 at the third capacitor E3 lies below the second energy level N2. The switching means is S thus opened and the second capacitor E2 is not charged, i.e., it continues to contain a voltage V2=0 V. The first and the third capacitors E1 and E3, on the other hand, are jointly charged, due to their connection in parallel, linearly by the constant current I, and determine the input voltage Vin. The charging of the first and third capacitors E1 and E3 starts when the input voltage Vin exceeds the threshold voltage of the diodes D1 and D3. For the sake of simplicity, the influence of the threshold voltage is not represented, so that Vin=V1=V3 is shown.

At a time t1, the voltage V3 at the third capacitor E3 reaches a second predetermined energy level N2, or a second predetermined voltage N2. The control circuit C outputs a signal to the node F at this time, whereby the switching means S connects the diode D2, and, when Diode D2 conducts, the second capacitor E2 as well, to the input E (see the lowest time curve in FIG. 3, which represents the voltage at the node F). The input voltage Vin thereby assumes the voltage V2 of the second capacitor E2, which is V2=0 here.

In the period of time between t1 and t2, the second capacitor E2 is now also charged. Since it has a larger capacitance than the first and third capacitors E1 and E3, the voltage rise is less steep than the voltage rise of E1 and E3 in the period t0 to t1. The input voltage Vin is determined by the voltage V2 of the second capacitor E2.

Because of their higher voltages V1 and V3 relative to the input voltage Vin, the first capacitor E1 and the third capacitor E3 are decoupled by means of the diodes D1 and D3 from the input voltage and do not influence it. The first capacitor E1 and the third capacitor E3 supply the load V and the energy level comparator IC1 with energy, whereby their energy level is reduced. For the sake of clarity, it is shown in FIG. 3 that the voltages V1 and V3 decrease with the same slope. Actually the slope results from the capacitances of the first and the third capacitors E1 and E3 and from the currents provided by the capacitors E1 and E3.

The energy level V3 of the third capacitor E3 at the time t2 has decreased to a first predetermined energy level N1, or a first predetermined voltage N1. To ensure a reliable energy supply for the load V, the energy level V1 of the first capacitor E1 must be prevented from falling further. For that purpose, the switching means S is driven by the control circuit C in such a manner that there is no connection of the second capacitor E2 to the energy source Q, as shown by the voltage at the node F in FIG. 3. The energy of the energy source Q is no longer used to charge the second capacitor E2, so that the first capacitor E1 can be charged more quickly.

The input voltage Vin jumps in this case to the lower voltage among the voltages V1 and V3 of the first and the third capacitors E1 and E3. This voltage is selected in FIG. 3 to be equal to the first predetermined voltage N1. Then the capacitor with the lower voltage is charged to the higher voltage on the other capacitor. As soon as the capacitors E1 and E3 show the same voltage, they are charged together, with the same voltage increase. For simplicity, it is assumed in FIG. 3 that the voltage curves V1 and V3 are substantially identical, although they can also be different due to different currents flowing out of the capacitors. Starting from the time t3, the third capacitor E3 has again been charged to the second predetermined voltage N2. Since no current can flow out or in between the times t2 and t3, the second capacitor E2 keeps its voltage V2 constant during this period of time.

The process from the times t1 to t3 repeats itself until the voltage V2 at the second capacitor E2 exceeds the first predetermined voltage N1 and can itself contribute to the energy supply for the load V. The second capacitor E2 can thus be further charged, without impairing the energy supply for the load V.

At a time t4, the voltages V1, V2 and V3 of the first, the second and the third capacitors E1, E2 and E3 are equally large; the capacitors E1, E2 and E3 are charged jointly and with the same voltage Vin because they are connected in parallel. The slope of the voltage increase for the period between t4 and t5 is shallower than between the times t0 to t1 or t1 to t2, because now all three of the capacitors E1, E2 and E3 are being charged in parallel by the energy source Q.

At the time t5, all of the energy storage devices E1, E2 and E3 are charged to the maximum energy level M or to the maximum voltage M. The maximum voltage M can be predetermined by the energy source Q, as happens for example for a photovoltaic converter. The maximum possible energy level M can also be restricted by energy level limiters, such as the energy level limiters S1 and S2 shown in FIGS. 5 and 6.

At the time t6, it is assumed that the energy source Q is no longer supplying a current I. This can occur, for instance, if the photovoltaic converter is no longer irradiated, at night for example. The capacitors E1, E2 and E3 are disconnected via the diodes D1, D2 and D3 from the energy source Q, so that the input voltage falls to 0 V. The load V is now operated directly from the first capacitor E1, whereby its voltage V1 decreases. At a time t7, the voltage V1 has fallen sufficiently far that the voltage V2 at the second capacitor E2 has become greater by the threshold voltage of the diode D4 than the voltage at the first capacitor E1. The diode D4 becomes conductive and the load V is now additionally supplied with energy from the second energy storage device E2. The slope following the time t7 depends on the capacitance of the parallel-connected first and second capacitors E1 and E2, and the energy required by the load V. The threshold voltage of the diode D4 is not taken into consideration in FIG. 3, so that the curves for V1 and V2 coincide. At the same time, it is assumed that the third capacitor E3 discharges after the time t7 with the same slope as the first and second capacitors E1 and E2. These restrictions are not necessary; they simply serve to keep the figure clear.

Figure 4:
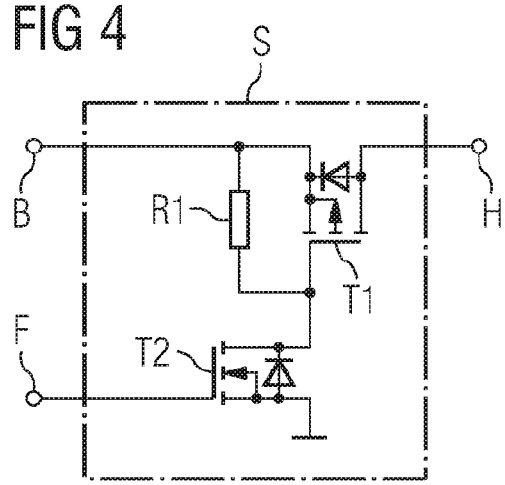
FIG. 4 shows an exemplary embodiment of a switching means.

FIG. 4 shows an exemplary embodiment of a switching means S consisting of a PMOS transistor T1, an NMOS transistor T2 and a resistor R1. The transistor T2 is controlled via the node F and connects the gate of the transistor T1 to ground, or disconnects it from ground. If the transistor T2 is conductive, then transistor T1 likewise conducts, whereby a connection is produced between the terminals B and H. If the transistor T2 blocks, then the gate of the transistor T1 becomes positive via the resistor R1 with respect to the node B, whereby the transistor T1 blocks. The switching means S is connected as shown in FIG. 1 to the nodes B, F and H. Other switching means S with similar functionality are also possible.

Figure 5:
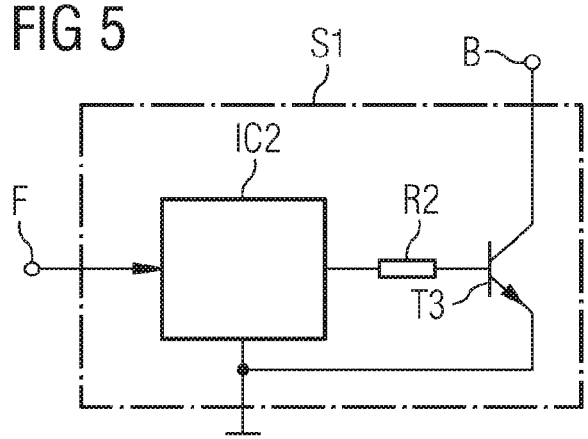
FIG. 5 shows an exemplary embodiment of an energy level limiter.

FIG. 5 shows an exemplary embodiment of an energy level limiter S1, with which the energy at the input E can be limited. The node B of the input E is connected here via a transistor T3 to ground. The transistor T3 is controlled here by an energy level comparator IC2 via a resistor R2. The input of the energy level comparator IC2 is connected to the node F, which also serves to control the switching means S. The control circuit C is constructed for this purpose in such a manner that it emits a signal with 0 V or the voltage V3 of the third capacitor E3 at the node F, as shown in FIG. 2. Since the voltage V3 agrees with Vin, apart from the threshold voltage of the diode D3, the input voltage Vin can therefore also be tapped at the node. The voltage Vdd at the output A, with which the load is operated, can be adjusted via a reference energy level, or via a reference voltage of the energy level comparator IC2. If the voltage at the node F is above the reference voltage, then the node B and also the energy source Q are short-circuited via the transistor T3 to ground. On the other hand, if it lies below the reference voltage, then the transistor T3 is not conductive. The energy level comparator IC2 here can be constructed like the energy level comparator IC1 and have the same functionality.

Figure 6:
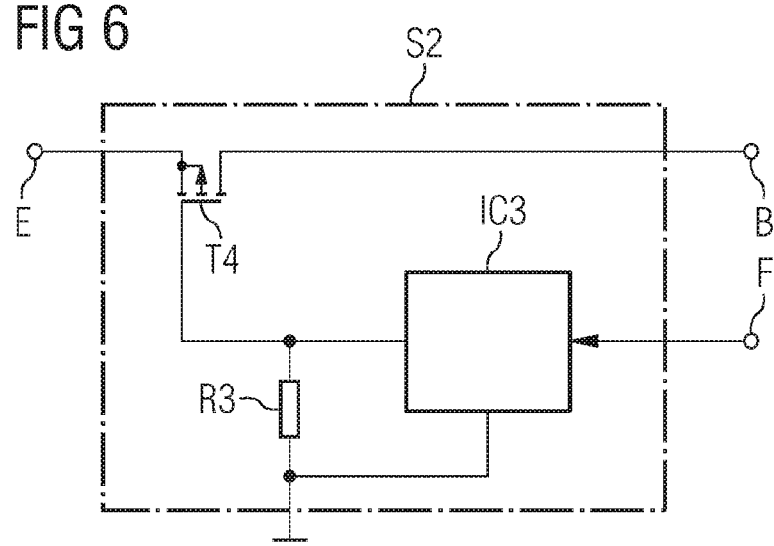
FIG. 6 shows another embodiment of an energy level limiter.

FIG. 6 shows an exemplary embodiment of an additional energy level limiter S2, in which the connection between the input E and the node B is controlled via the transistor T4. In a similar manner as in FIG. 5, an energy level comparator IC3 is provided, whose input is connected to the node F and which controls the transistor T4 via the resistor R3. The energy is limited here by longitudinal control, rather than by shunting.

The energy level limiters S1 and S2 can also be connected at other points in the circuit, such as output A or one of the energy storage devices, in order to limit the energy level.

LIST OF REFERENCE NUMBERS

A Output
B Node
C Control circuit
D1, D2, D3, D4 Nonreturn devices
E Input
E1, E2, E3 First, second and third energy storage devices
F Node
I Current
IC1, IC2, IC3 Energy level comparator
H Node
K Node
L Node
M Maximum energy level
N1, N2 First and second energy level
Q Energy source, environmental energy converter
R1, R2, R3 Resistors
S Switching means
S1, S2 Energy level limiters
t1-t7 Times
T1, T2, T3, T4 Transistors
V Load
V1, V2, V3 Voltages at the capacitors

The invention claimed is:

1. A supply energy apparatus, comprising:
an input coupled with an energy source;
an output to connect to a load;
a first energy storage device coupled with the input via a first diode and with the output;
a second energy storage device coupled with the output, with the input via a second diode and a switch in a closed position, and with the first energy storage device via the first diode that prevents a flow of current from the first energy storage device to the second energy storage device, wherein the switch in an open position prevents a flow of current from the input to the second energy storage device; and
a control circuit to:
  open the switch to disconnect the second energy storage device from the input responsive to a first determination that the first energy storage device is charged by the energy source to at least a second predetermined energy level and the second energy storage device has an energy level that lies below a first predetermined energy level; and
  close the switch to connect the second energy storage device to the input responsive to a second determination that the energy source has charged the first energy storage device to at least the second predetermined energy level and an energy level of the first energy storage device does not fall below a first predetermined energy level;
wherein the control circuit comprises a third energy storage device coupled with the input to supply the control circuit with energy.

2. A supply energy apparatus according to claim 1, characterized in that the second energy storage device has an energy storage capacity that is at least ten times greater than an energy storage capacity of the first energy storage device.

3. A supply energy apparatus according to claim 1, characterized in that the second energy storage device has an energy storage capacity that is at least one hundred times greater than an energy storage capacity of the first energy storage device.

4. A supply energy apparatus according to claim 1, characterized in that the control circuit has an energy level comparator that compares the energy level of the first energy storage device or an energy level of the third energy storage device to the first and the second predetermined energy levels.

5. A supply energy apparatus according to claim 1, characterized in that an energy level limiter is provided that limits an energy level in a supply energy arrangement to a maximum value.

6. A supply energy apparatus according to claim 1, characterized in that the first energy storage device and the second energy storage device are capacitors.

7. A supply energy apparatus according to claim 1, characterized in that the energy source is an environmental energy converter.

8. A supply energy apparatus according to claim 1, characterized in that the apparatus is configured as an integrated circuit.

9. A method for providing power, comprising:
  providing an energy storage apparatus comprising:
    an input coupled with an energy source;
    a first energy storage device coupled with the input via a first diode and with an output;
    a second energy storage device coupled with the output, with the input via a second diode and a switch in a closed position, and with the first energy storage device via the first diode that prevents a flow of current from the first energy storage device to the second energy storage device, wherein the switch in an open position prevents a flow of current from the input to the second energy storage device, and
    a control circuit configured to control the switch;
  opening, by the control circuit and responsive to the second energy storage device having an energy level below a first predetermined energy level, the switch to disconnect the second energy storage device from the input;
  charging the first energy storage device from the energy source to increase an energy level of the first energy storage device to at least a second predetermined energy level,
  closing, by the control circuit and responsive to the first energy storage device reaching the second predetermined energy level, the switch to connect the second energy storage to the input;
  supplying energy from the first energy storage device;
  charging the second energy storage device from the energy source;
  opening, by the control circuit and responsive to the energy level of the first energy storage device falling below the first predetermined energy level, the switch to disconnect the second energy storage device from the energy source for the period of time required to charge the first energy storage device to at least the second predetermined energy level; and
  supplying the supply energy from the first energy storage device and the second energy storage device.

10. A method according to claim 9, characterized in that the first energy storage device has an energy storage capacity that is at least ten times less than an energy storage capacity of the second energy storage device.

11. A method according to claim 9, characterized in that the first energy storage device has an energy storage capacity that is at least one hundred times less than an energy storage capacity of the second energy storage device.

12. A method according to claim 11, characterized in that an energy level of a third energy storage device is used to determine that the second energy storage device will be charged, the third energy storage device being coupled to the energy source and not serving to provide supply energy.

13. A method according to claim 12, wherein a third diode prevents a flow of current from the third energy storage device to the energy source.

* * * * *